US008265184B2

(12) United States Patent
Li et al.

(10) Patent No.: US 8,265,184 B2
(45) Date of Patent: Sep. 11, 2012

(54) DIGITAL COMMUNICATIONS RECEIVER AND METHOD OF ESTIMATING RESIDUAL CARRIER FREQUENCY OFFSET IN A RECEIVED SIGNAL

(75) Inventors: Lingjie Li, Ottawa (CA); Shiquan Wu, Nepean (CA)

(73) Assignee: Wi-LAN, Inc., Ottawa (CA)

( * ) Notice: Subject to any disclaimer, the term of this patent is extended or adjusted under 35 U.S.C. 154(b) by 424 days.

(21) Appl. No.: 12/621,331

(22) Filed: Nov. 18, 2009

(65) Prior Publication Data

US 2011/0116562 A1    May 19, 2011

(51) Int. Cl.
*H04K 1/10*    (2006.01)
(52) U.S. Cl. ...................................... 375/260
(58) Field of Classification Search ............. 375/260
See application file for complete search history.

(56) References Cited

U.S. PATENT DOCUMENTS

| | | | | |
|---|---|---|---|---|
| 5,838,734 | A * | 11/1998 | Wright | 375/316 |
| 6,658,063 | B1 * | 12/2003 | Mizoguchi et al. | 375/260 |
| 6,687,290 | B1 * | 2/2004 | Okazaki | 375/226 |
| 6,952,570 | B2 * | 10/2005 | Nagayasu | 455/208 |
| 7,346,135 | B1 * | 3/2008 | Narasimhan | 375/346 |
| 7,362,802 | B2 * | 4/2008 | Saed | 375/229 |
| 7,526,020 | B2 * | 4/2009 | Kao et al. | 375/229 |
| 2007/0058734 | A1 * | 3/2007 | Kao et al. | 375/260 |
| 2009/0028042 | A1 * | 1/2009 | Chin et al. | 370/203 |

FOREIGN PATENT DOCUMENTS

WO    2008052573    5/2008

OTHER PUBLICATIONS

International Search Report and Written Opinion issued on Mar. 29, 2011, in corresponding application No. PCT/CA2010/001801, 9 pages.

Chen, H. et al., "A Comparision of Frequency Offset Tracking Algorithms for OFDM" IEEE Global Telecommunications Conference 2003, GLOBECOM'03, vol. 2, pp. 1069-1073, Dec. 1-5, 2003.

Chen, X. et al., "A Novel Synchronization Scheme for OFDM-Based CMMB Receivers" IEEE 8th International Conference on ASIC 2009, ASICON'09, Changsha, Hunan, pp. 529-532, Oct. 20-23, 2009.

Zhenyl, L. et al, "National Science Council Research Project interim progress report of the sub-project II: Orthogonal frequency division multiplexing as many model-based development of the baseband", Project No. NSC92-2220-E-009-019, Jun. 1, 1993, retrieved Mar. 3, 2011, <URL:http://ir.lib.nctu.edu.tw/bitstream/987654321/15580/1/922220E009019.pdf>, p. 7.

* cited by examiner

*Primary Examiner* — Juan A Torres
(74) *Attorney, Agent, or Firm* — Procopio, Cory, Hargreaves & Savitch LLP

(57) ABSTRACT

A carrier frequency offset can be present in a signal received by a communications receiver when the receiver has a local frequency oscillator that generates a carrier frequency different from a carrier frequency generated by a local frequency oscillator at a transmitter that transmitted the signal. A residual carrier frequency offset can remain after most of the carrier frequency offset has been removed from the received signal using conventional techniques. The residual carrier frequency offset is estimated using first and second channel impulse responses derived from first and second portions of the received signal. An estimated phase difference between the first and second channel impulse responses is computed. An estimate of the residual carrier frequency offset is computed using the estimated phase difference.

8 Claims, 3 Drawing Sheets

DIGITAL COMMUNICATIONS RECEIVER AND METHOD OF ESTIMATING RESIDUAL CARRIER FREQUENCY OFFSET IN A RECEIVED SIGNAL

FIELD OF THE INVENTION

This invention relates in general to digital communications and, in particular, to a digital communications receiver and method of removing residual carrier frequency offset from a received signal.

BACKGROUND OF THE INVENTION

Digital communications is critical to the success of modern communications technology. Orthogonal frequency division multiplexing (OFDM) is a viable modulation scheme for packet communications. It has been adopted in a number of communication standards including DSL, 802.11 WiFi, 802.16 WiMAX, 802.22 WRAN, and 3GPP LTE etc. One of the major limitations of OFDM is frequency synchronization errors caused by frequency differences between a local oscillator in a transmitter and the local oscillator in a receiver of an OFDM modem. This frequency difference is called carrier frequency offset (CFO). CFO contributes to a number of impairments to OFDM system performance, such as inter carrier interference (ICI) among OFDM subcarriers, attenuation and constellation rotation. Needless to say, one important signal processing function in an OFDM receiver is to estimate and remove CFO.

In an OFDM system, a transmitted data sequence usually includes a training sequence (preamble) and predefined pilot subcarriers in each OFDM symbol. For example, in the proposed 802.22 standard, a superframe preamble is transmitted at the beginning of each superframe, and a frame preamble is transmitted at the beginning of each frame. Each superframe contains 16 frames and each frame contains 25 to 41 OFDM symbols and has a duration of 10 ms. Moreover, in each OFDM symbol 1680 subcarriers are used, and 240 of those subcarriers are pilot subcarriers. The value transmitted on the pilot subcarriers is predetermined and known to the receiver.

Classical CFO estimation methods examine information in the OFDM preambles to detect and estimate CFO. However, channel imperfections and noise deteriorate CFO estimation accuracy, and residual CFO remains in the received data sequence after CFO estimation and removal has been performed. Since there are usually a large number of OFDM data symbols between two preambles, the residual CFO may result in significant performance degradation.

The detection of residual CFO in the frequency domain is known, as taught in U.S. Pat. No. 7,526,020 which issued on Apr. 28, 2009 to Kao et al.

SUMMARY OF THE INVENTION

Embodiments of the invention provide a digital communications receiver and method of estimating residual carrier frequency offset by examining signal information in the time domain.

One aspect of the invention therefore provides a method of estimating a residual carrier frequency offset in a signal received by a receiver which has a local frequency oscillator that generates a carrier frequency different from a carrier frequency generated by a local frequency oscillator at a transmitter that transmitted the received signal, the method comprising: computing first and second channel impulse responses using first and second portions of the received signal; estimating a phase difference between the first and second channel impulse responses; and computing the estimate of the residual carrier frequency offset using the computed phase differences.

A further aspect provides a method of estimating a residual carrier frequency offset in a orthogonal frequency division multiplexing (OFDM) signal received by an OFDM receiver after most of the carrier frequency offset has been removed from the received signal, comprising: sequentially receiving a Fast Fourier Transform of a pair of OFDM symbols embodied in the signal received by the OFDM receiver; for each of the respective OFDM symbols in the pair, computing a channel frequency response for pilot subcarriers output by the Fast Fourier Transform, and assigning a channel frequency response of zero to data subcarriers output by the Fast Fourier Transform; performing an Inverse Fast Fourier Transform on the channel frequency responses for the respective OFDM symbols in the pair to obtain a channel impulse response for each OFDM symbol; estimating a phase difference between the channel impulse response computed for the respective OFDM symbols in the pair; and estimating the residual carrier frequency offset using the estimated phase difference.

Yet a further aspect provides a digital communications receiver, comprising: coarse carrier frequency offset estimation and removal; residual carrier frequency offset estimation that estimates the residual carrier frequency offset by computing a channel frequency response for pilot subcarriers in a first and second portion of a digital communications signal received by the receiver, performing an Inverse Fast Fourier Transform on the respective channel frequency responses to obtain respective first and second channel impulse responses, estimating a phase difference between the first and second channel impulse responses, and estimating the residual carrier frequency offset using the phase difference; and residual carrier frequency offset removal that uses the estimated residual carrier frequency offset to remove the residual carrier frequency offset from the communications signal.

An aspect still further provides an OFDM receiver, comprising: a coarse carrier frequency offset estimation module; a coarse carrier frequency offset removal module; a residual carrier frequency offset estimation module that estimates a residual carrier frequency offset after the coarse carrier frequency offset has been estimated and removed, by computing a channel frequency response for pilot subcarriers in a pair of OFDM symbols received by the OFDM receiver, performing an Inverse Fast Fourier Transform on the respective channel frequency responses to obtain respective first and second channel impulse responses, estimating a phase difference between the first and second channel impulse responses, and estimating the residual carrier frequency offset using the estimated phase difference.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

In one embodiment, the invention is implemented in a discrete-time baseband OFDM system, and the invention will be explained below with reference to OFDM. However, it should be understood that the invention is not limited to OFDM and can be implemented in receivers that are designed or provisioned to operate using other communications protocols. In an embodiment of the invention, pilot symbols in OFDM data symbols are used to estimate a channel impulse response (CIR) of a received signal. Residual CFO is estimated using the estimated CIR derived from at least one pair of data symbols. Averaging can be used if multiple pairs of data symbols are used to estimate the residual CFO. Averaging further improves the residual CFO estimation accuracy. Residual CFO estimation in accordance with embodiments of the invention has the advantage of high accuracy, does not require the pilot symbols to be on the same subcarriers in different OFDM symbols, and can be applied to any OFDM system which uses pilot symbol subcarriers interspersed with data symbol subcarriers.

Figure 1:
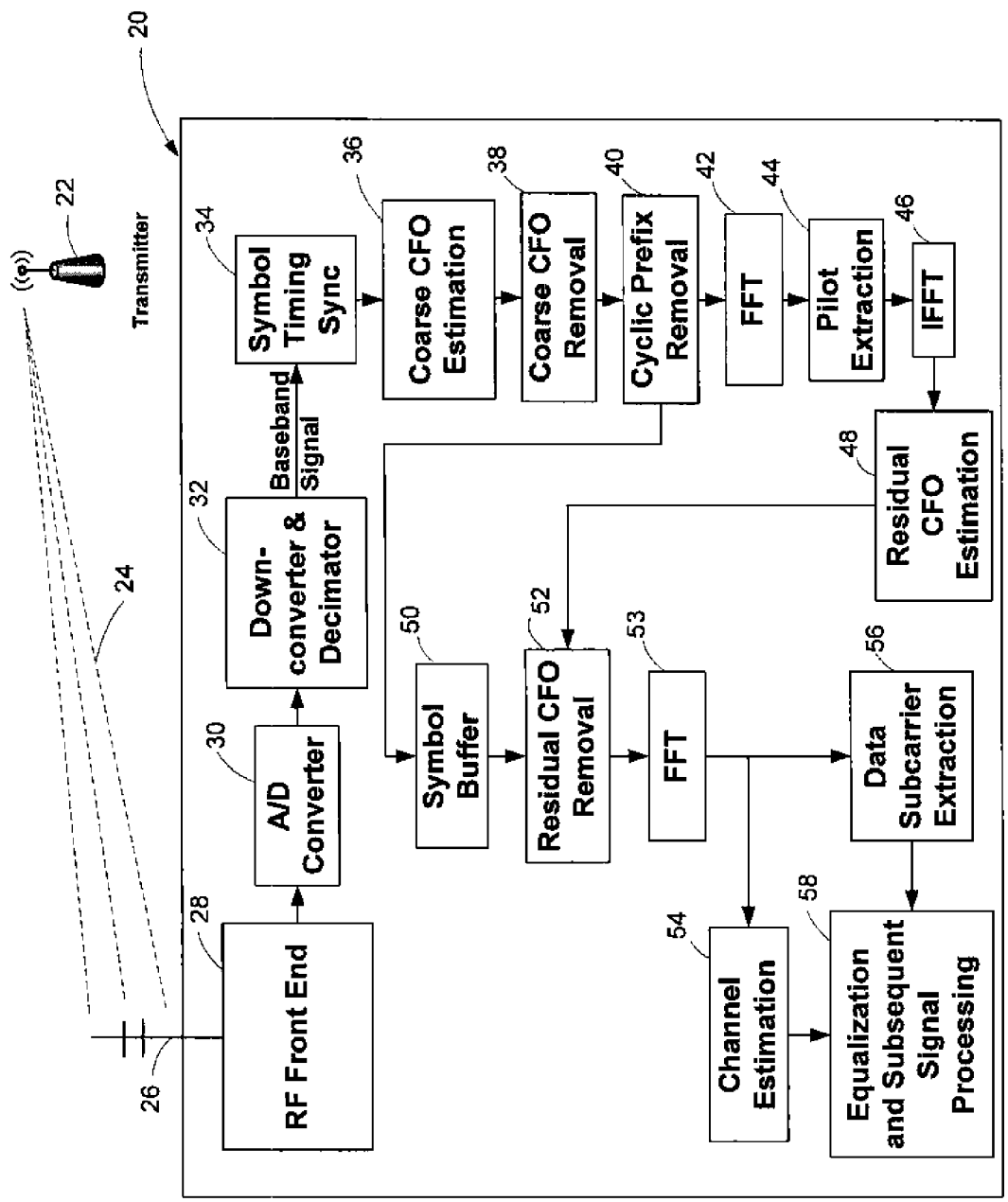
FIG. 1 is a schematic diagram of one embodiment of a digital communications receiver provisioned with residual CFO estimation in accordance with an embodiment of the invention.

FIG. 1 is a schematic functional block diagram of one exemplary embodiment of a receiver 20 provisioned with residual CFO estimation in accordance with an embodiment of the invention. A transmitter 22 transmits a communications signal 24 to the receiver 20. In one embodiment, the transmitter is an OFDM transmitter that transmits an OFDM signal that is received by an antenna 26 of the receiver 20, and the receiver 20 is an OFDM receiver. A radio frequency (RF) front end 28, well known in the art, includes an RF module which downconverts and shapes the received signal in accordance with the requirements of an analog-to-digital (A/D) converter 30. The A/D converter 30 samples the signal at a predetermined rate and outputs a digital signal that is passed to a digital downcoverter and decimator 32, which converts the digital signal to baseband in a manner satisfying the Nyquist rule. The baseband signal is passed to a symbol timing and synchronization module 34 that determines a position and extent of each OFDM symbol in the baseband signal, also in a manner well known in the art. A coarse CFO estimation module 36 performs coarse CFO estimation using any one of many algorithms that are well known in the art. The estimated coarse CFO information is passed to a coarse CFO removal module 38 that uses a time domain multiplier function well known in the art to remove most of the CFO from the baseband signal. In some embodiments the coarse CFO estimation and removal functions are performed by a single module. The cyclic prefixes are then removed from the baseband signal and the baseband signal is input in parallel on an OFDM symbol-by-symbol basis to a Fast Fourier Transform (FFT) 42 and an OFDM symbol buffer 50. The FFT 42 processes the baseband signal in the frequency domain. Output of the FFT 42 is passed to a pilot extraction module 44.

The pilot extraction module 44 extracts pilot subcarriers from the FFT output and computes a channel frequency response (H'(k)) for each pilot subcarrier, as will be explained below in more detail with reference to FIG. 2. Output from the pilot extraction module 44 is passed to an Inverse Fast Fourier Transform (IFFT) 46 which performs an IFFT on (H'(k)) to obtain a time domain channel impulse response (CIR) for the OFDM symbol. The CIR is passed to a residual CFO estimation module 48 which estimates the residual CFO using the methods described below with reference to FIGS. 2 and 3.

The symbol buffer module 50, which can be implemented as a first-in-first-out (FIFO) memory register, for example, stores each OFDM symbol output by the cyclic prefix removal module 40 for a predetermined period of time that is dependent on the residual CFO estimation implementation, as will be explained below in more detail with reference to FIGS. 2 and 3, to permit residual CFO estimation to be performed on some of the OFDM symbols. Output from the residual CFO estimation module 48 is passed to a residual CFO removal module 52 that receives the delayed symbols from the symbol buffer module 50, and removes residual CFO using a time domain multiplier function that functions in the same way as the coarse CFO removal function. Output from the residual CFO removal module 52 is passed to a FFT module 53 that transforms the time domain signal into the frequency domain. Output of the FFT module 53 is passed to a channel estimation module 54 which outputs channel estimation information used for signal equalization by a signal equalization module and subsequent signal processing 58. Output of the FFT module 53 is also passed to a data subcarrier extraction module 56. The data subcarrier extraction module 56 extracts the data subcarriers from the signal, also in a manner well known in the art. The output from the data subcarrier extraction module 56 is passed to the signal equalization module and subsequent signal processing 58, which is well known in the art and will not be explained in any further detail. Other well known components, modules and functions of the receiver 20 are not specifically illustrated nor described. Instead, they are generally represented by the receiver 20.

Figure 2:
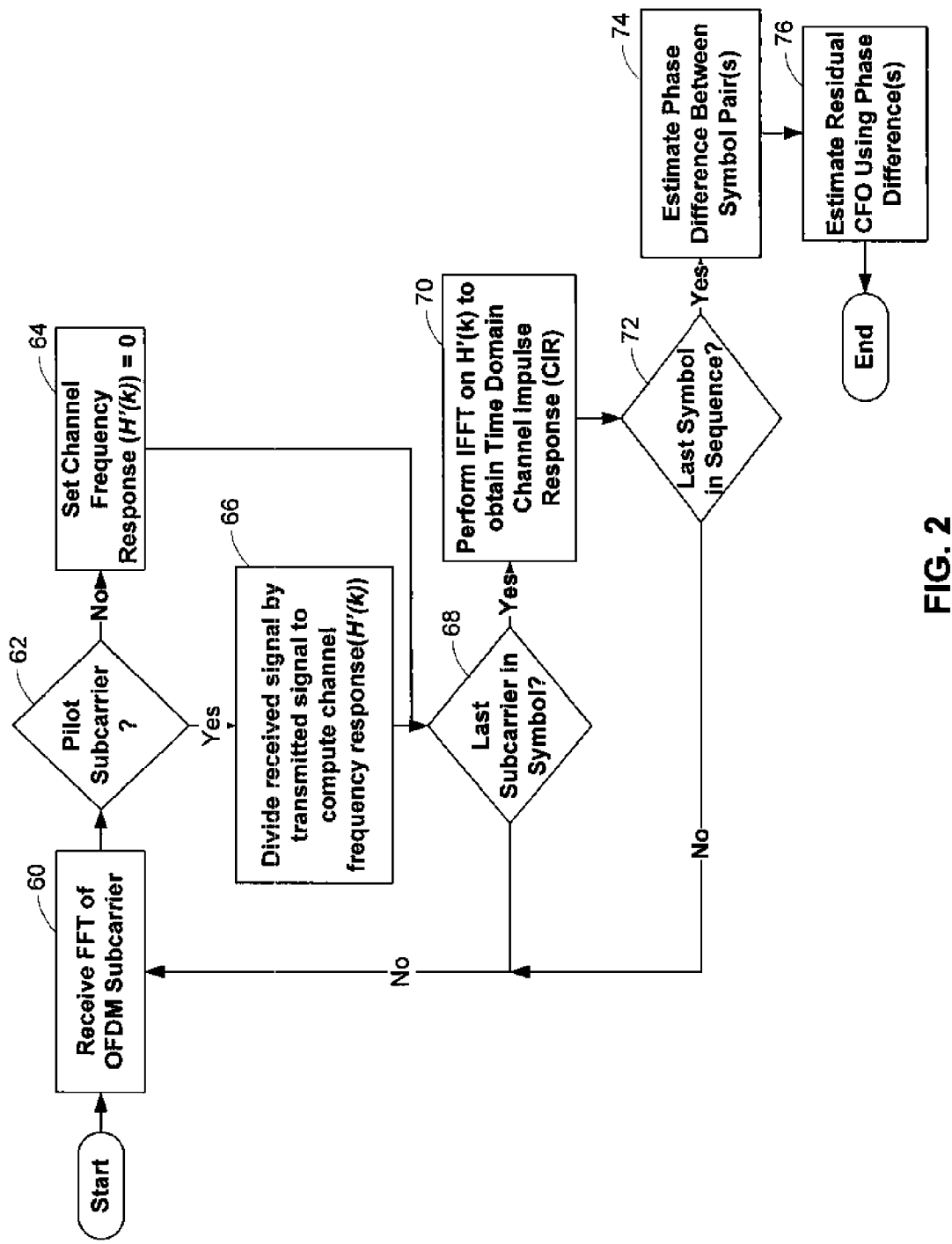
FIG. 2 is a flow diagram of a method of residual CFO estimation in accordance with an embodiment of the invention.

FIG. 2 is a flow diagram of the method of residual CFO estimation in accordance with an embodiment of the invention. In estimating residual CFO in accordance with embodiments of the invention, it is assumed that any residual CFO is much smaller than a subcarrier spacing between two neighboring subcarriers in the received signal. It is also assumed that symbol timing synchronization in the receiver is well designed, i.e., aside from thermal noise the residual CFO is the principal cause of system performance degradation.

As is well known in the art, each OFDM symbol consists of N subcarriers. The OFDM radio channel is a frequency selective multipath fading channel with a time domain channel impulse response function h(n) with path $N_p$ components such that:

$$h(n) = \sum_{l=c1}^{c2} h_l \delta(n - n_l),  \qquad \text{eq. 1}$$

where: $h_l$ and $n_l$ are respectively the complex-valued gain and relative delay of the l th path. The Doppler shift in the radio channel is considered a part of the path gain. The path gain is assumed to be time invariant over the OFDM symbols used to compute the residual CFO. It is also assumed that h(n) includes a time offset generated by the symbol timing synchronization module 34 (FIG. 1). It is further assumed that the symbol timing synchronization module 34 can estimate the values of $n_{c1}$ and $n_{c2}$.

If there is no residual CFO, the received signal on the $k^{th}$ subcarrier can be expressed as $$Y(k) = H(k)X(k) + W(k), \qquad \text{eq. 2}$$

where:
k∈[0,N−1];
N is the FFT size used in the OFDM system;
H(k) is the channel frequency response;

X(k) is the value modulated onto the subcarrier; and
W(k) is the additive white Gaussian noise (AWGN) at the $k^{th}$ subcarrier.

The AWGN at different subcarriers is assumed to be independent of the respective subcarriers and equally distributed across the respective subcarriers.

When residual CFO exists, the received signal in the time domain can be expressed as:

$$y'(n) = \frac{1}{N}\left[\sum_{k=0}^{N-1} H(k)X(k)e^{j2\pi n(k+v)/N}\right] + w(n) = y(n)e^{j2\pi v/N} + w(n), \quad \text{eq. 3}$$

Where:
n∈[0,N−1];
v is the CFO normalized by the subcarrier spacing;
w(n) is the time domain AWGN signal; and $$y(n) = \frac{1}{N}\left[\sum_{k=0}^{N-1} H(k)X(k)e^{j2\pi n/N}\right]$$

is the time domain received signal without residual CFO.

The received frequency-domain signal on the $k^{th}$ subcarrier affected by residual CFO is:

$$Y'(k) = \sum_{l=0}^{N-1} y'(l)e^{-j2\pi kl/N} = \quad \text{eq. 4}$$

$$\sum_{l=0}^{N-1} H(l)X(l)\frac{\sin(\pi v)}{N\sin(\pi(l-k+v)/N)}e^{j\pi v(N-1)/N}e^{-j\pi(j-k)/N} + W(k).$$

Equation 4 can be rewritten as:

$$Y'(k) = \quad \text{eq. 5}$$
$$H(k)X(k)\frac{\sin(\pi v)}{N\sin(\pi(l-k+v)/N)}e^{j\pi v(N-1)/N}e^{-j\pi(j-k)/N} + W(k).$$

where:

$$ICI_k = \sum_{\substack{l=0 \\ l \neq k}}^{N-1} H(l)X(l)\frac{\sin(\pi v)}{N\sin(\pi(l-k+v)/N)}e^{j\pi v(N-1)/N}e^{-j\pi(j-k)/N} \quad \text{eq. 6}$$

Equation 6 represents the intercarrier interference (ICI) caused by the residual CFO. Since the residual CFO is small compared to the subcarrier spacing, the ICI is also small. When the AWGN is moderate, the received signal can be approximated as:

$$Y'(k) \approx H(k)X(k)\frac{\sin(\pi v)}{N\sin(\pi v/N)}e^{j\pi v(N-1)/N}, \quad \text{eq. 7}$$

As shown in FIG. 2, when the pilot extraction module 44 receives the output from the FFT 42, it determines at 62 if whether the respective subcarriers in the received signal are pilot subcarriers or data subcarriers using predetermined information based on the OFDM protocol of the transmitted signal. If it is determined that a particular subcarrier is not a pilot subcarrier, the variable (H'(k)) associated with that subcarrier is set equal to zero at 64. If, however, it is determined at 62 that the subcarrier is a pilot subcarrier, the received subcarrier signal Y'(k) is divided by the known value X(k) transmitted on the pilot subcarrier to compute the channel frequency response (H'(k)), as follows:

$$H'(k) = \frac{Y'(k)}{X(k)} \approx H(k)\frac{\sin(\pi v)}{N\sin(\pi v/N)}e^{j\pi v(N-1)/N}, \quad \text{eq. 8}$$

It is then determined at 68 whether the last subcarrier in the OFDM symbol has been examined. If not, the process returns to 60 and the next subcarrier is examined as explained above. If so, an IFFT is performed at 70 on H'(k) to obtain a time domain channel impulse response (CIR) h'(n). It is assumed that the pilot index pattern is designed in such a way that in the time domain h'(n)≈$h_{all}$'(n) when n∈[$n_{c1}$,$n_{c2}$], i.e. the residual CFO associated with the pilot subcarriers is representative of the CFO associated with the data subcarriers.

It is then determined at 72 whether a last OFDM symbol in a implementation-specific sequence of consecutive OFDM symbols used to estimate the residual CFO has been examined. As will be explained below in more detail, residual CFO is estimated using the time domain CIR of at least one pair of OFDM symbols selected from a group of consecutive OFDM symbols.

For example, a $2^{nd}$ OFDM symbol closely following the above-referenced OFDM symbol is examined. The start index of the second OFDM symbol has a time offset of $n_1$ samples compared to the start index of the first symbol examined. It is assumed that the channel remains constant for the first and second OFDM symbols. The time domain received signal for the second symbol can be expressed as $$y_1''(n+n_1) = \quad \text{eq. 10}$$
$$\frac{1}{N}\left[\sum_{k=0}^{N-1} H(k)X_1(k)e^{j2\pi nk/N}\right]e^{j2\pi nv/N}e^{j2\pi n_1 v/N} + w(n+n_1) =$$
$$y_1(n)e^{j2\pi nv/N}e^{j2\pi n_1 v/N} + w(n+n_1) = y_1'(n)e^{j2\pi n_1 v/N} + w(n+n_1),$$

Where:
n∈[0,N−1];
$X_1(k)$ is the value modulated on to the k th subcarrier;

$$y_1(n) = \frac{1}{N}\left[\sum_{k=0}^{N-1} H(k)X_1(k)e^{j2\pi nk/N}\right]$$

is the received signal without CFO; and $y'_1(n) = y_1(n)e^{j2\pi nv/N}$ is the received signal with CFO if the 2nd symbol is not time shifted by $n_1$ samples.

For the second symbol, the received frequency-domain signal on the $k^{th}$ subcarrier affected by CFO is:

$$Y_1'(k) = \sum_{l=0}^{N-1} y_1''(l+n_1)e^{-j2\pi kl/N}. \quad \text{eq. 11}$$

Using the same procedure used to obtain H'(k), Y"(k) is divided by $X_1(k)$ on the pilot subcarriers to obtain:

$$H_1''(k) = \frac{Y_1''(k)}{X_1(k)} \approx H'(k)e^{j2\pi n_1 v/N}, \quad \text{eq. 12}$$

As explained above, for each data subcarrier in the second OFDM symbol, H"(k) is set to zero at 64. An IFFT is performed on H"$_1$(k). at 70 to obtain the time domain CIR h"$_1$(n). For the same time range n∈[n$_{c1}$,n$_{c2}$], it should be noted that h"$_1$(n)≈h'(n)e$^{j2\pi n_1 v/N}$.

A phase difference between h'(n) and h"$_1$(n) is estimated at 74 as follows:
φ is the phase difference between h'(n) and h"$_1$(n).
φ is estimated as follows:

$$\phi = -\operatorname*{mean}_{n \in [n_{c1}, n_{c2}]}(h'(n) * \text{conjugate}(h_1''(n))). \quad \text{eq. 12}$$

The residual CFO value v' is then estimated at 76 using the following formula:

$$v' = \frac{1}{2\pi} \frac{N}{n_1} \phi \quad \text{eq. 13}$$

Note that φ usually has a detection range of φ∈(-π,+π). The time offset between the two symbols is an integer number of OFDM symbols, therefore the residual CFO detection range can be expressed as:

$$v' \in \left(-\frac{N}{2n'}, +\frac{N}{2n'}\right) \ldots$$

As explained above, residual CFO estimation uses a pair of OFDM symbols having a variable separation between them. If the receiver 20 is provisioned with logic for computing the residual carrier frequency offset as described above using multiple pairs of consecutive OFDM symbols, the estimation accuracy can be improved by averaging estimation results for two or more of the pairs of OFDM symbols. For example, with a sequence of OFDM symbols labeled Symbol 1, 2, 3, 4, 5 and 6, the receiver 20 can be programmed to perform residual carrier frequency offset estimation using symbol pairs (1, 4), (2, 5) and (3, 6). The three estimated residual CFO values are then averaged to yield an estimate of the residual CFO that is generally more accurate than an estimate derived from a single OFDM symbol pair. As was discussed above in connection with FIG. 1, the residual CFO is then removed using the estimate of the residual CFO.

Figure 3:
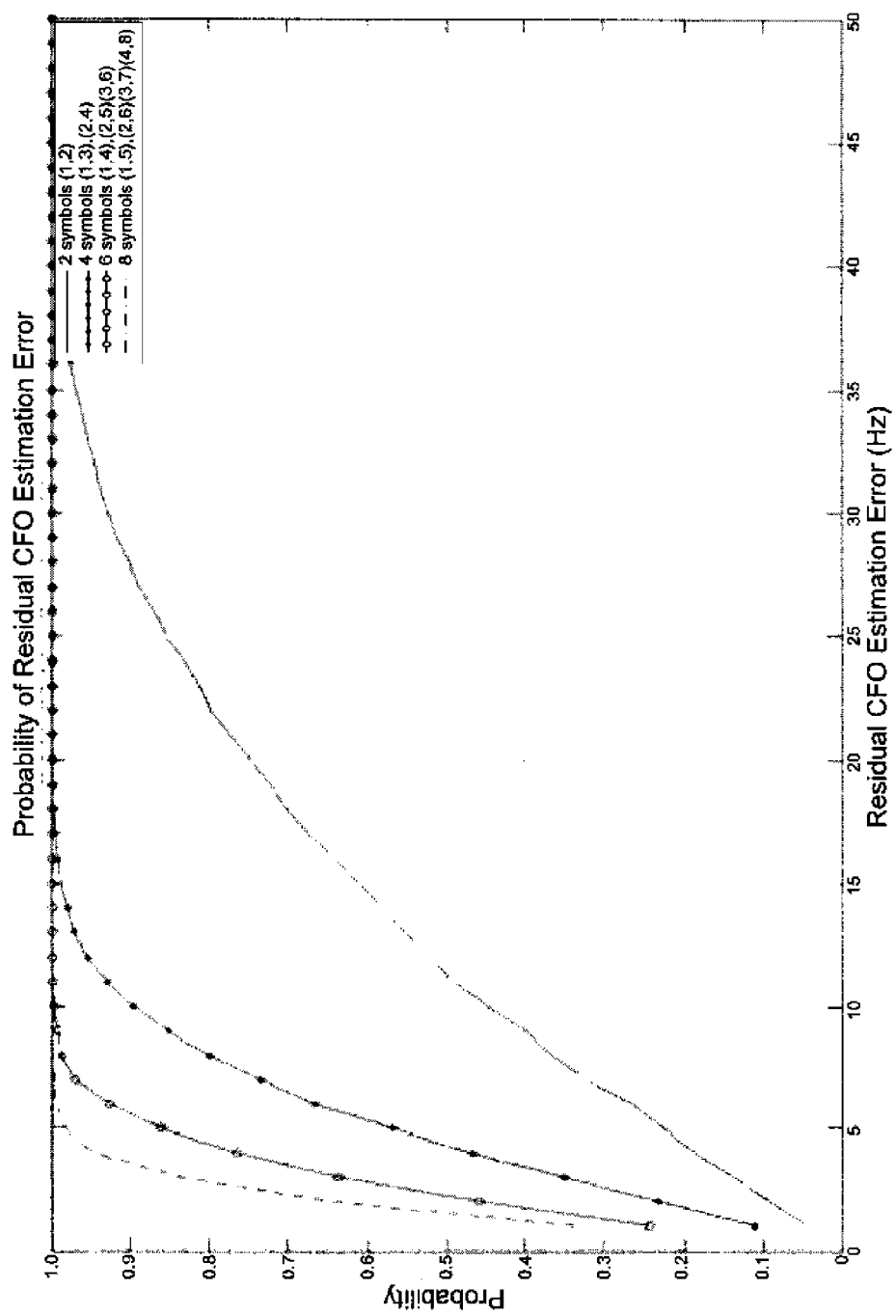
FIG. 3 is a graph representing simulation results of various implementations of the method of residual CFO estimation in accordance with an embodiment of the invention.

FIG. 3 is a graph representing the simulated results of various implementations using different numbers of pairs of OFDM symbols to estimate residual CFO in accordance with an embodiment of the invention. The results show that increasing the number of OFDM symbol pairs used to estimate residual CFO improves the residual CFO estimation accuracy, but decreases a range within which residual CFO can be detected.

Accordingly, the present invention is not limited to only those implementations described above. Those of skill in the art will appreciate that the various illustrative modules, functional blocks and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, functional block or step is for ease of description. Specific functions can be moved from one module, functional block or step to another without departing from the invention.

The various illustrative modules, functional blocks and method steps described in connection with the implementations disclosed herein can be implemented or performed with a processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine readable storage media such as RAM memory, flash memory, ROM memory, EPROM memory, EEPROM memory, registers, hard disk, a removable disk, a CD-ROM, or any other form of computer readable storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations.

We claim:

1. A method of operating an orthogonal frequency division multiplexing (OFDM) receiver for estimating a residual carrier frequency offset in an OFDM signal received by the OFDM receiver after most of the carrier frequency offset has been removed from the received signal, comprising:

sequentially receiving a Fast Fourier Transform of a pair of OFDM symbols embodied in the signal received by the OFDM receiver;

for each of the respective OFDM symbols in the pair, computing a channel frequency response for pilot subcarriers output by the Fast Fourier Transform, and assigning a channel frequency response of zero to data subcarriers output by the Fast Fourier Transform;

performing an Inverse Fast Fourier Transform on the channel frequency responses for the respective OFDM symbols in the pair to obtain a channel impulse response for each OFDM symbol;

estimating a phase difference between the channel impulse response computed for the respective OFDM symbols in the pair; and estimating the residual carrier frequency offset using the estimated phase difference.

2. The method as claimed in claim 1 wherein the pair of the respective OFDM symbols comprises adjacent OFDM symbols in the received OFDM signal.

3. The method as claimed in claim 1 wherein the pair of the respective OFDM symbols comprises non-adjacent OFDM symbols in the received OFDM signal.

4. The method as claimed in claim 3 wherein the non-adjacent symbols in the received OFDM signal comprise OFDM symbols selected from a group of consecutive OFDM symbols in the received signal.

5. The method as claimed in claim 1 wherein computing a channel frequency response for the pilot subcarriers output by the Fast Fourier Transform (FFT) comprises:

estimating the received signal using:

$$y'(n) = \frac{1}{N}\left[\sum_{k=0}^{N-1} H(k)X(k)e^{j2\pi n(k+v)/N}\right] + w(n) = y(n)e^{j2\pi nv/N} + w(n),$$

where:
n∈[0,N−1];
N is the FFT size used in the OFDM system;
v is the residual carrier frequency offset (CFO) normalized by the subcarrier spacing;
w(n) is the time domain AWGN; and $$y(n) = \frac{1}{N}\left[\sum_{k=0}^{N-1} H(k)X(k)e^{j2\pi nk/N}\right]$$

is the time domain received signal without residual CFO;

computing the channel frequency response (H'k) using:

$$H'(k) = \frac{Y'(k)}{X(k)},$$

where:
X(k) is a known value modulated onto the pilot subcarrier.

6. The method as claimed in claim 5 wherein estimating the phase difference between the channel impulse responses computed for the pair of the respective OFDM symbols is performed using:

$$\phi = -\underset{n\in[n_{c1},n_{c2}]}{\text{mean}}(h'(n) * \text{conjugate}(h''_1(n)));$$

where:
h' (n) is the channel impulse response for a first OFDM symbol of the pair; and
h" (n) is the channel impulse response for a second OFDM symbol of the pair.

7. The method as claimed in claim 6 wherein estimating the residual carrier frequency offset (v') using the estimated phase difference, is performed using:

$$v' = \frac{1}{2\pi}\frac{N}{n_1}\phi;$$

where:
N is the Fast Fourier Transform (FFT) size used in the OFDM system; and
$n_1$ is the time offset in FFT samples between a start index of the first OFDM symbol and a start index of the second OFDM symbol.

8. The method as claimed in claim 4 further comprising averaging the computed estimate of the residual carrier frequency offset computed with respect to multiple pairs of non-adjacent OFDM symbols in the group.

* * * * *